United States Patent
Shawl et al.

Patent Number: 5,413,634
Date of Patent: May 9, 1995

[54] CEMENT COMPOSITION

[75] Inventors: Edward T. Shawl, Wallingford; Haven S. Kesling, Jr., Drexel Hill, both of Pa.

[73] Assignee: Arco Chemical Technology, L.P., Greenville, Del.

[21] Appl. No.: 238,566

[22] Filed: May 5, 1994

Related U.S. Application Data

[63] Continuation-in-part of Ser. No. 102,866, Aug. 6, 1993, abandoned.

[51] Int. Cl.$^6$ ............................................. C04B 24/32
[52] U.S. Cl. ................................... 106/696; 106/724; 106/790; 106/823
[58] Field of Search ................ 106/696, 724, 726, 728, 106/790, 819, 823, 802; 524/3, 4, 6

[56] References Cited

U.S. PATENT DOCUMENTS

| | | | |
|---|---|---|---|
| 2,776,713 | 2/1979 | Morgan et al. | 166/22 |
| 3,583,880 | 6/1971 | Moren et al. | 117/54 |
| 4,547,223 | 10/1985 | Goto et al. | 106/823 |
| 4,686,252 | 8/1987 | Burge et al. | 524/3 |
| 5,174,820 | 12/1992 | Sakuta et al. | 106/823 |

FOREIGN PATENT DOCUMENTS

| | | |
|---|---|---|
| 48-43014 | 6/1973 | Japan . |
| 58-60293 | 10/1984 | Japan . |

OTHER PUBLICATIONS

Ostrikov, M. S., G. D. Dibrov, T. P. Petrenko, and E. E. Gorshkova: Deforming Effect of Osmotically Dehydrating Liquid Media. Kolloidnyi Zhural, vol. 27, pp. 82–86, 1965. Rostov–na–Donu State University and Rostov Institute of Construction Engineering. Manuscript received Apr. 28, 1963.

Shah, et al. "Effects of Shrinkage –Reduced Admixtures on Restrained Shrinkage Cracking of Concrete", *ACI Materials Journal* May –Jun. 1992, pp. 289–295.

*Primary Examiner*—Mark L. Bell
*Assistant Examiner*—Paul Marcantoni
*Attorney, Agent, or Firm*—John C. Martin, Jr.; William C. Long

[57] ABSTRACT

The invention relates to a cement composition containing a shrinkage reducing amount of an alkyl ether derivative of an aliphatic polyhydroxy compound of the formula:

$$Q\text{—}[(A)_n\text{—}OR]_x$$

wherein Q is a $C_3$–$C_{12}$ aliphatic hydrocarbon group, R is hydrogen or $C_1$–$C_{10}$ alkyl, at least one R being the $C_1$–$C_{10}$ alkyl group, A is $C_2$–$C_4$ oxyalkylene, n is 0–10, and x is 3–5.

10 Claims, No Drawings

CEMENT COMPOSITION

RELATED APPLICATION

This application is a continuation-in-part of application Ser. No. 08/102,866, filed Aug. 6, 1993, now abandoned.

BACKGROUND OF THE INVENTION

1. Field of the Invention

The present invention relates to cement compositions which contain a shrinkage reducing amount of an alkyl ether derivative of an aliphatic polyhydroxy compound such as glycerin, preferably a dialkyl ether derivative and most preferably the di-t-butyl ether of glycerin.

2. Description of the Prior Art

An important disadvantage of cement mortar and concrete is the tendency to shrink and crack upon setting and drying.

U.S. Pat. No. 4,547,223 addresses this problem and suggests the use of compounds of the general formula:

$$RO(AO)_nH$$

in which R represents a $C_{1-7}$ alkyl or $C_{5-6}$ cycloalkyl radical, A represents one or more $C_{2-3}$ alkylene radicals, and n is 1–10 as shrinkage reducing additives for cement.

U.S. Pat. No. 5,174,820 suggests reducing the dry shrinkage of cement by the addition thereto of terminal alkyletherified or terminal alkylesterified compounds of polymers having —$C_2H_5O$— and/or —$C_3H_6O$— as a repetitive unit.

Japan Patent Application No. 58-60293 suggests reducing dry shrinkage of cement by the addition thereto of compounds of the formula:

$$R_1OX_mY_nR_2$$

where $R_1$ and $R_2$ represent aliphatics, alicyclics or aromatics having 1 to 10 carbon atoms, X represents —$CH_2CH_2O$—, Y represents —$CH(CH_3)CH_2O$—, m and n are 0 or greater, and m+n is 1 to 15.

Ostrikov, et al., Kolloidnyi Zhumal, Vol. 27, pp 82–86 (1965) suggests the addition of anhydrous glycerin to cement.

Despite the efforts of prior workers, the problem of shrinkage and crack formation in the drying and setting of cement compositions remains a serious problem.

BRIEF DESCRIPTION OF THE INVENTION

In accordance with the present invention, it has been found that dry shrinkage and cracking of cement compositions can be significantly reduced by incorporating in the cement composition an effective amount of an alkyl ether derivative of an aliphatic polyhydroxy compound having the formula:

$$Q-[(A)_n-OR]_x$$

wherein Q is a $C_3$–$C_{12}$ aliphatic hydrocarbon group, R is hydrogen or a $C_1$–$C_{16}$ alkyl group with the proviso that at least one R is a $C_1$–$C_{16}$ alkyl group, A is a $C_2$–$C_4$ oxyalkylene group, n is 0–10, and x is 3–5.

Illustrative shrinkage reducing agents which are employed according to the invention are those having the above formula derived from $C_3$–$C_2$ aliphatic triols such as glycerol, 1,2,4-butanetriol, 2,3,4-petanetriol, 2-ethyl-2-(hydroxymethyl)-1, 3-propanetriol (trimethylol propane), 1,1,1-tris(hydroxymethyl)ethane, 1,2,6-trihydroxyhexane, 1,2,3-heptanetriol, and the like, $C_4$–$C_{12}$ aliphatic tetrols (eg. 2,3,4,5-hexanetetrol, sorbitan, erythritol, pentaerythritol), $C_5$–$C_8$ sugar alcohols [including those compounds corresponding to the formula $HOCH_2(CHOH)_nCH_2OH$ wherein n is 3 to 6 such as xylitol, sorbitol, arabitol, mannitol, and the like], monosaccharides (eg. erythrose, threose, ribose, arabinose, xylose, lyxose, allose, altrose, glucose, mannose, gulose, idose, galactose, fructose, galactose, and the like), disaccharides (eg. sucrose, lactose, maltose) and alkyl glycosides (eg. methyl glycosides, ethyl glycosides, propyl glycosides, and other glycoside molecules wherein the alkyl glycoside is an acetal formed by interaction of a $C_1$–$C_{20}$ alcohol with a carbonyl group of a mono- or a disaccharide such as glucose). Also suitable for use as the polyol are polysaccharides such as cellulose, hydroxycellulose, chitin, guar, and starches as well as hydroxy-containing substances such as tetrahydrofuran oligomers, oxetane oligomers, sorbitol oligomers, glycerol oligomers, and the like.

Where there are more than one alkyl group represented by R above, preferably the R's are the same alkyl group. Illustratively, R is methyl, ethyl, propyl, isopropyl, n-butyl, isobutyl, t-butyl, amyl, t-amyl, hexyl, heptyl, octyl, 2,4,4-trimethylpentyl, nonyl, decyl and the like. R is preferably a $C_4$–$C_5$ tertiary alkyl group.

Especially preferred additives employed in practice of the invention have the formula $$\begin{array}{l} CH_2-(A)_n-OR_1 \\ | \\ CH-(A)_n-OR_2 \\ | \\ CH_2-(A)_n-OR_3 \end{array}$$

where $R_1$, $R_2$ and $R_3$ are each hydrogen or a $C_1$–$C_{16}$ alkyl group with the proviso that at least one of $R_1$, $R_2$ or $R_3$ are the $C_1$–$C_{16}$ alkyl group, A is a $C_2$–$C_4$ oxyalkylene group and n is an integer from 0–10. Preferably $R_1$ and $R_3$ are the same alkyl group, such as methyl, ethyl, propyl, isopropyl, n-butyl, isobutyl, t-butyl, amyl, t-amyl, hexyl, hextyl, octyl, nonyl, decyl and the like. Most preferably, $R_1$ and $R_3$ are the same $C_4$–$C_5$ tertiary alkyl group. Mixtures can be employed including mixtures of additives with different alkyl groups and/or different oxyalkylene groups; mixtures of 1,2 diether, 1,3 diether and 1,2,3 triether are preferred.

A can be —$O-CH_2-CH_2$—,

—$O-CH_2-CH(CH_3)$—;

—$O-CH_2-CH_2-CH_2$—,

—$O-CH_2-CH(CH_3)-CH_2$—,

—$O-CH_2-CH_2-CH_2-CH_2$—,

—$O-CH(CH_3)-CH_2-CH_2$—,

-continued

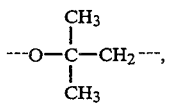

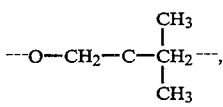

and the like;

A can also be comprised of different oxyalkylene groups, e.g. both oxyethylene and oxypropylene groups.

In the case of the oxyalkylene derivatives of glycerin, preferred additives are those having the following formula:

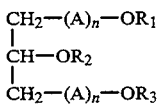

wherein $R_1$ and $R_3$ are $C_1$–$C_{16}$ alkyl groups, preferably t-butyl or t-amyl groups, $R_2$ is hydrogen, n is 4–10, and A is

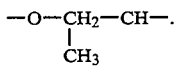

The preparation of such materials is shown, for example, in U.S. Pat. Nos. 2,932,670, 2,932,616 and 4,241,224.

In a particularly preferred practice, the glycerin is etherified by reaction with isobutylene or t-butanol or the corresponding $C_5$ of $C_6$ materials, in order to produce a product mixture comprised primarily of the 1,3-di-t-alkyl; ether and lesser amounts of the 1,2-di-t-alkyl ether and the 1,2,3-tri-t-alkyl ether of glycerin. Especially advantageous in this reaction is the use of a highly cross-linked sulfonic acid resin catalyst such as Amberlyst XN1010 with an isoalkane to glycerin ratio of 2:1 or higher at temperatures in the range of 40°–150° C., preferably 55°–75° C.

The cements with which the shrinkage-reducing agent of the invention may be used include ordinary, quick-hardening, and moderate-heat portland cements, alumina cement, blast-furnace slag cement, and flash cement. Of these, portland cements of the ordinary and quick-hardening types are particularly desirable.

The quantity of additive used may vary with factors such as the carbon number of the alkyl radical of the compound added. But the quantity of the shrinkage-reducing agent to be used in accordance with the invention is usually in the range of 0.1–10%, preferably 0.5–4%, based on the weight of cement. If the quantity is less than 0.1% by weight, the compound will give only a little shrinkage-reducing effect. If the quantity exceeds 10 wt. %, costs of the additive are excessive. The quantity of water to be used for setting the cement is not critical; generally weight ratios of water to cement in the range 0.25:1 to 0.7:1, preferably 0.3:1 to 0.5:1 are satisfactory. Where necessary, an aggregate such as pebbles, gravels, sand, pumice, or fired pearlite may be employed in conventional amounts. The quantity of the shrinkage-reducing agent is usually 0.1–10%, based on the weight of the cement, or usually 0.02–3% on the basis of the total weight of the cement, shrinkage-reducing agent, water and aggregate combined.

Advantageously, the shrinkage reducing agents of this invention are used in combination with other known shrinkage reducing agents as well as with other cement additives.

Alcohols such as t-butyl alcohol as listed in U.S. Pat. No. 5,181,961 can be used with the additives of this invention.

The additives listed in co-pending application Ser. No. 08/191,563, filed Feb. 3, 1994 can be used with the additives of this invention. Such additives are mono-ether derivatives of certain dihydroxy compounds as well as mono- and di-hydric compounds such as t-butyl alcohol and dipropylene glycol. See also International Publication WO 82/03071, European 308,950 and European 573,036. Especially useful are polyoxyalkylene glycol such as polypropylene glycol having a molecular weight of about 200–1000.

The commercial mono-ether formulations of U.S. Pat. No. 4,547,223 having the formula described above can be used advantageously with the additives of this invention. In general, the shrinkage reducing agents of the present invention can advantageously be used in combination with any of the shrinkage reducing agents previously known in the art.

Esters of fatty acids can be used in the formulation of the invention. Especially suitable are $C_1$–$C_4$ alkyl ester of $C_4$–$C_{20}$ fatty acids as illustrated by methyl soyate, ethyl stearate, methyl oleate, and the like.

Various other conventional ingredients may also be used. Among the optionally employable ingredients are: conventional hardening accelerators, e.g., metal chlorides such as calcium chloride and sodium chloride, metal sulfates, such as sodium sulfate, and organic amines such as triethanol-amine; ordinary hardening retarders, e.g. alcohols, sugars, starch and cellulose; reinforcing-steel corrosion inhibitors such as sodium nitrate and calcium nitrite; water reducing agents such as ligninsulfonic acid salt, as well as salts of oxycarboxylic acid and formalin condensate of naphthalenesulfonic acid; air extrainers; super plasticizers; and the like. The quantity of such an optional ingredient or ingredients is usually 0.1–6% by weight of the cement.

The manner of adding the shrinkage-reducing agent of the invention to the cement may be the same as with ordinary cement admixtures. For example, the shrinkage-reducing agent is admixed with a suitable proportion of water and then this composition is mixed with cement and aggregate. As an alternative, a suitable amount of the shrinkage-reducing agent may be added when cement, aggregate and water are mixed.

The concrete and the like incorporating the shrinkage-reducing agent according to the invention may be applied in conventional ways. For example, it may be trowelled, filled in forms, applied by spraying, or injected by means of a caulking gun. Hardening or curing of the concrete and the like may be by any of the air drying, wet air, water and heat-assisted (steam, autoclave, etc.) curing techniques. If desired, two or more such techniques may be combined. The respective curing conditions may be the same as in the past.

The addition of the shrinkage-reducing agent of the invention to the cement will markedly reduce the drying shrinkage of the resulting concrete as compared with that of the plain concrete. The admixture according to the invention when added in a large proportion (e.g., several percent), does not substantially reduce the strength of the product.

The following examples illustrate the invention.

EXAMPLE 1

Free shrinkage was determined for cement containing various additives in accordance with ASTM C-305. To a cement/water paste with 0.4 parts of water per part by weight cement was added 2 wt. % additive, and the resulting paste was formed into a 1"×1"×11" bar which was cured for 24 hours at 73° F. and 100% humidity, demolded and stored at 73° F. and 50% humidity. Measurements of shrinkage were made for 1"×1"×11" bars over a period of six weeks, and the shrinkage reduction was compared to the case when no additive was employed. The following table shows the results obtained:

TABLE 1

| Additive | Wt. % | % Shrinkage Reduction | |
|---|---|---|---|
| | | at 28 days | at 42 days |
| DTBG* | 2% | 45 | 46 |

*A mixture of 10% 1,2-di-t-butyl glycerin, 76% 1,3-di-t-butyl glycerin, and 14% 1,2,3-tri-t-butyl glycerin by weight.

By way of contrast, where 2% by weight glycerin was used, shrinkage actually increased 77% in 21 days as compared to the no additive case, and the bar had broken by 28 days.

EXAMPLE 2

The procedure of Example 1 was repeated using a sand/cement mixture of 2 parts sand by weight per part cement, a water to cement weight ratio of 0.49/1 and employing 1% by weight based on cement of the same additive mixture used in Example 1.

After 10 days, shrinkage reduction was 38% compared with the same formulation containing no additive.

After 28 days, shrinkage reduction was 34% compared with the same formulation containing no additive.

EXAMPLE 3

Drying shrinkage cracking of cement pastes and mortar mixes was measured using the ring test method developed by Shah, et al. (ACI Materials Journal, Vol. 89, pp 289-295, 1992). A mold consisting of a 12" diameter, removable, carbon steel outer ring and a 8⅜" OD×3"×½" thick carbon steel inner ring mounted on a 12" diameter carbon steel base plate was used for the test. Test samples were placed in the mold and cured for 6 hours at 73° F. and 100% RH, then the outer ring was removed, the top of the sample was coated with a silicone-based caulk and the ring was held at 73° F. and 50% RH and monitored for crack formation.

A typical mortar mix for a 2% additive mix was made using 1750 g Type I Portland cement, 2500 g sand (saturated, surface dry) and 840 g water for a water to cement ration of 0.48 and 35 g additive for a 2% additive by weight on cement. The total weight of water and additive was maintained at 875 g for other additive concentrations. The restrained shrinkage test is a severe measure of drying shrinkage because of the short cure time, the hoop stress of the ring, and the drying conditions.

With the use of 2 wt. % DTBG, the sample cracked after 26 days, this compares favorably with a sample containing no additive which cracked after 10 days.

EXAMPLE 4

The procedure of Example 2 was repeated using an additive blend of 1% DTBG and 1% dipropylene glycol t-butyl ether based the weight of cement. Shrinkage reduction after 28 days was 43%.

EXAMPLE 5

The procedure of Example 3 was repeated using an additive blend of 0.4% DTBG and 1.6% methyl soyate based on the weight of cement. After 42 days, the sample had not cracked.

Using just 1.6% methyl soyate, no reduction in free shrinkage was observed.

EXAMPLE 6

The procedure of Example 3 was repeated using various additives as well as a control containing no additive. The control cracked after 6 days. Using 2% tertiary butyl alcohol (93% by weight in water) cracking occurred after 13 days. Using a blend of 1% DTBG and 1% of the 93% tertiary butyl alcohol, cracking occurred after 23 days.

We claim:

1. A cement composition comprised of cement and a shrinkage reducing amount of an alkyl ether derivative of an aliphatic polyhydroxy compound having the formula:

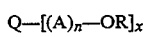

$$Q-[(A)_n-OR]_x$$

wherein Q is $C_3-C_{12}$ aliphatic hydrocarbon group, each R is hydrogen or a $C_1-C_{16}$ alkyl group with the proviso that at least one is $C_1-C_{16}$ alkyl, A is a $C_2-C_4$ oxyalkylene group, n is 0-10, and x is 3-5.

2. A cement composition comprised of cement and a shrinkage reducing amount of an alkyl ether derivative of glycerin having the formula:

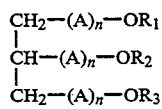

$$\begin{array}{l} CH_2-(A)_n-OR_1 \\ | \\ CH-(A)_n-OR_2 \\ | \\ CH_2-(A)_n-OR_3 \end{array}$$

wherein $R_1$ and $R_2$ and $R_3$ are each hydrogen or a $C_1-C_6$ alkyl group with the proviso that at least one of $R_1$, $R_2$ or $R_3$ is $C_1-C_{16}$ alkyl, A is a $C_2-C_4$ oxyalkalene group, and n is 0-10.

3. The composition of claim 2 wherein $R_1$ and $R_3$ are $C_4-C_5$ tertiary alkyl groups.

4. The composition of claim 2 wherein $R_1$ and $R_3$ are tertiary-butyl groups.

5. The composition of claim 2 wherein n is 0, $R_2$ is hydrogen and $R_1$ and $R_3$ are $C_4-C_5$ tertiary alkyl groups.

6. The composition of claim 2 wherein the said ether derivative has the formula:

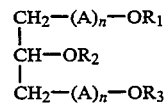

$$\begin{array}{l} CH_2-(A)_n-OR_1 \\ | \\ CH-OR_2 \\ | \\ CH_2-(A)_n-OR_3 \end{array}$$

wherein $R_2$ is hydrogen, n is 4-10, A is $$-O-CH_2-CH- \atop {\phantom{-O-CH_2-}|\phantom{H-}} \atop \phantom{-O-CH_2-}CH_3$$

and $R_1$ and $R_3$ are $C_4$–$C_5$ tertiary alkyl groups.

7. The composition of claim 2 also containing a $C_4$–$C_6$ aliphatic mono-alcohol.

8. A cement composition comprised of cement and a shrinkage reducing amount of an alkyl ether derivative of glycerin having the formula:

$$CH_2-(A)_n-OR_1$$
$$CH-(A)_n-OR_2$$
$$CH_2-(A)_n-OR_3$$

wherein $R_1$ and $R_2$ and $R_3$ are each hydrogen or a $C_1$–$C_{16}$ alkyl group with the proviso that at least one of $R_1$, $R_2$ or $R_3$ is $C_1$–$C_{16}$ alkyl, A is a $C_2$–$C_4$ oxyalkylene group, and n is 0–10, and also containing a polyoxyalkalene glycol having a molecular weight in the range 200–1,000.

9. A cement composition comprised of cement and a shrinkage reducing amount of an alkyl ether derivative of glycerin having the formula:

$$CH_2-(A)_n-OR_1$$
$$CH-(A)_n-OR_2$$
$$CH_2-(A)_n-OR_3$$

wherein $R_1$ and $R_2$ and $R_3$ are each hydrogen or a $C_1$–$C_{16}$ alkyl group with the proviso that at least one of $R_1$, $R_2$ or $R_3$ is $C_1$–$C_{16}$ alkyl, A is a $C_2$–$C_4$ oxyalkalene group, and n is 0–10, and also containing an additive having the formula:

$$RO(AO)_nH$$

where R is a $C_{1-7}$ alkyl or $C_{5-6}$ cycloalkyl group, A is a $C_{2-3}$ alkylene radical and n is 1–10.

10. The composition of claim 2 also containing a fatty acid ester additive.

* * * * *